United States

Glatzel et al.

4,089,591

May 16, 1978

[54] EXTREMELY HIGH SPEED OBJECTIVE

[75] Inventors: Erhard Glatzel, Heidenheim; Heinz Zajadatz, Essingen, both of Germany

[73] Assignee: Carl Zeiss Stiftung, Oberkochen, Germany

[21] Appl. No.: 669,265

[22] Filed: Mar. 22, 1976

[30] Foreign Application Priority Data

Mar. 22, 1975 Germany .................... 2512797

[51] Int. Cl.² .................................... G02B 13/04
[52] U.S. Cl. ........................................ 350/214
[58] Field of Search ........................... 350/214

[56] References Cited

U.S. PATENT DOCUMENTS

3,915,558  10/1975  Glatzel .................... 350/214

*Primary Examiner*—Conrad J. Clark
*Attorney, Agent, or Firm*—Stonebraker, Shepard & Stephens

[57] ABSTRACT

A high power objective or lens system of the same general kind as disclosed in Glatzel U.S. Pat. No. 3,915,558, but with a larger aperture and a slightly smaller angular field of view. Rules or conditions are disclosed which, if complied with, will result in a lens with improved image formation. The present lens is particularly suitable for cinematographic purposes.

10 Claims, 6 Drawing Figures

EXTREMELY HIGH SPEED OBJECTIVE

BACKGROUND OF THE INVENTION

This invention relates to an objective or lens system which may be described as having extremely high speed with an extended field of view, and is particularly useful for cinematographic purposes. It is of the same general type as the lenses disclosed in U.S. Pat. No. 3,915,558, granted Oct. 28, 1975 for an invention of Erhard Glatzel, one of the joint inventors named in the present application. The present invention may be regarded as an improvement on the lenses disclosed in said patent.

The objective of the present invention complies with certain rules or conditions stated below, which differentiate the present objective from the lens system disclosed in said patent. It is found that when these rules are followed, a lens can be constructed to have a larger effective aperture than the maximum aperture disclosed in said patent, the enlargement of aperture being sufficiently great so that the lens may properly be described as being an extremely high speed objective. At the same time, a very high quality of image is produced, with adequate correction of aberrations. The angular field of view of the present lens is somewhat less than the angular field of view of the lens disclosed in said patent, but the angular field of the present lens is sufficiently large for practical purposes, especially when the lens is used for cinematographic purposes, for which it is particularly suitable.

DESCRIPTION OF THE PREFERRED EMBODIMENTS

In describing the lens or objective of the present invention, and illustrating the same in the diagrams, it will be assumed, as customary in lens patents and in scientific literature, that the light is coming from the left of the diagram toward the right thereof. Parts described as being at the front or in the forward portion of the lens are those parts near the left of the diagram, and parts described as being at the rear or back of the lens are those parts near the right of each diagram. Light from a distant object proceeds rightwardly to the front element of the lens, enters the lens system, passes through it, leaves the lens system at the last surface of the last or rearmost element of the system, and forms an image at an image plane to the rear of the last element. The word "lens" is sometimes used with reference to the entire objective or lens system as a whole, and sometimes used with reference to a particular individual lens element or perhaps a group of elements, but in any event the context will make the meaning clear to those skilled in the art.

The various embodiments of the present invention have much in common with the various embodiments of the lens disclosed in the above mentioned U.S. Pat. No. 3,915,558. However, there are important differences, which lead to improved results in producing high quality images and reducing aberrations, and which result in a simplification of the lens.

In general terms, the present objective has a front component, designated in the lens diagrams by the letter A and also by the Roman numeral I, which is of a negative or dispersing character. Behind this component, and spaced from it by an air space constituting an air lens $\alpha$, there is a second component indicated by the letter B and also by the Roman numeral II, this second component having positive power. Behind this is a third component which may be described as a meniscus component, and which is indicated in the diagrams by the letter M and also by the Roman numeral III. These three components A and B and M together constitute what may be described as the front member or front portion of the lens.

Behind this front member is a rear member or rear group indicated in general, in the diagrams, by the letters RG. In each embodiment, this rear group consists of four lens elements indicated in the diagrams by the Roman numerals IV, V, VI, and VII. The first two elements IV and V of this rear group are negative elements, and the last two VI and VII are positive elements separated from each other by an air space constituting an air lens designated as $\delta$.

It will be noted from the various lens diagrams as well as from the data in the specific examples given below, that the front component A can be either a doublet made up of two elements, as in FIGS. 1 and 2, or may be a single element, as in FIGS. 3-6. Likewise, the second component B may be made either of two lens elements, as in FIGS. 1-3, or of a single element, as in FIGS. 4-6. The meniscus component M also may be made up of either two elements, as in FIGS. 1-3 and 5, or merely a single element as in FIGS. 4 and 6.

If a diaphragm or stop is used, it is placed in the space between the meniscus component M and the rear group RG, as indicated by the conventional schematic diaphragm symbols used in some of the diagrams. The rear group RG, as already mentioned, is made up of two negative elements followed by two positive elements, with the first or front surface of the first positive element preferably mating with and cemented to the second or rear surface of the second negative element. The second positive element constitutes the last positive element of the entire lens assembly or objective, and may sometimes be referred to for convenience as the element LP.

An important goal of the present invention is to provide an objective with a simplified front member, while at the same time having extremely high speed, and with a rather wide angle of view, without detriment to the desirable reduction of aberrations of higher order and keeping asymmetry errors of oblique rays sufficiently small to be not disturbing. The above mentioned patent discloses an embodiment (Example 6) having a speed of $f/1.3$. The present invention provides several examples having speeds of $f/1.25$, and one embodiment (Example 7) having a speed of $f/1.2$ and an angular field of view of 45.5°, which is an extremely fast lens speed for a lens system having such a wide angular field. Although the angular field of the present objective is somewhat less than that of the objective disclosed in said patent, nevertheless the angular field is entirely adequate for the intended purpose, and is achieved with important simplification of the front member of the lens.

To achieve these desirable results, it is found best to make the meniscus component M of only slight refractive power, as well as to have both the front and rear surfaces of this component curved so as to be convex toward the front. Also, both the front and the rear surface of the meniscus component adjoin air. This refers to the front and rear surfaces of the component as a whole, for if the meniscus component is made of two lens elements there may be a cemented surface at an intermediate location in the thickness of the meniscus component.

Referring now to the rear member or rear group of the lens, it is found desirable to make the refractive power of the second negative element (element V) greater than that of the first negative element (element IV) to such extent that the power of the first negative element is less than 0.90 times the refractive power of the second negative element. This may be expressed by the formula $\phi_{IV} < 0.90 \phi_V$, in which $\phi$ stands for the sum of the surface refractive powers of the corresponding element.

Still referring to the this rear group or member, it is desirable to have this second negative element closely followed by a positive element which, in turn, is followed by the last positive element of the entire system, with an air lens space (the air lens $\delta$) between these two positive members. An important feature of the present invention is the relationship of the refractive power of this air lens $\delta$ with respect to the total refractive power ($\Phi$) of the entire objective. According to the invention, the refractive power ($\phi_\delta$) of this air lens in the rear member or group is not less than 1.370 and not greater than 1.795 times the total refractive power of the objective.

Another important feature of the invention is the relationship of the refractive power of the last positive member of the rear group (LP or VII) to the refractive power of all the surfaces of the front negative component A. According to this invention, the quotient of the refractive power of the last positive element ($\phi_{LP}$) divided by the sum of the surface refractive powers ($\phi_A$) of all surfaces of the front negative component A is not less than 1.370 and not more than 2.015.

This important feature just mentioned, regarding the quotient of the refractive power of the last positive element divided by the refractive powers of the front negative component, is one of the important distinctions from the prior art. In the prior art relating to lenses of this general type, the lens designer always endeavored to use, in the rear member of the lens, components having the smallest possible converging power. In contrast, according to the present invention the sums of the surface powers is so distributed that the power of the last positive element in the rear member is substantially greater when the front component in the front element, and is within the limits just mentioned. This relationship refers to absolute numerical value of the powers, regardless of sign.

Also worthy of mention is the design of the air lens $\alpha$ formed between the rear surface of the front component A and front surface of the second component B. This air lens should have sides of unequal curvature, that is, the curvature of the rear face of component A should be different from the curvature of the front surface of component B. Also, this air lens should be meniscus shaped, and should be of relatively weak refractive power, in any event less, in absolute numerical value, than 0.185 times the equivalent refractive power ($\Phi$) of the entire objective.

To summarize, the two new rules or conditions which serve, in combination, to distinguish the objective of the present invention from prior objectives which are similar in a general way, may be stated in formula form as follows:

$$1.370 < Q < 2.015 \tag{a}$$

$$1.370 \, \Phi < \phi_\delta < 1.795 \, \Phi \tag{b}$$

wherein $Q$ is the quotient of $\phi_{LP}$ divided by $\phi_A$, considering only the absolute numerical value of this quotient regardless of sign, and wherein $\phi_{LP}$ is the paraxial lens refractive power of the last positive element in the rear group of the objective, and $\phi_A$ is the paraxial lens refractive power of all surfaces of the front negative component A, and $\phi_\delta$ is the air lens refractive power of the air lens between the above mentioned last positive element and the other positive element immediately in front of it, and $\Phi$ is the total refractive power of the entire objective or lens system.

When designing a lens system of the general character disclosed in the above mentioned patent, and having the other characteristics previously mentioned above, such as the air lens $\alpha$ between the components A and B, with relatively weak power having an absolute numerical value less than $0.185 \, \Phi$, and having the meniscus component M of only slight refractive power with its outer surfaces convex toward the front, and having behind this meniscus a first negative component with a refractive power less than 0.9 times the refractive power of another negative component next behind it, then with such a lens of this character it is found, according to the invention, that compliance with the above rules or conditions summarized in the above formulas (a) and (b) will result in an improved objective giving excellent results. As already indicated, an objective of very high speed can be produced, with a moderately wide angle of view, with extremely favorable image-forming performance having increased quality of the image in the lateral field of view, and good correction of residual aberrations in the inner and outer axial wide-aperture bundle of rays. Thus the problem is solved with great success, with only very slight expenditure of optical parts, and the sensitivity to tolerances is substantially reduced.

Eight specific examples of lenses according to the present invention are given in the following data tables. In all of these examples, all linear measurements such as radii, thicknesses, and spacings are stated as proportions of the equivalent focal length (F) of the entire objective or lens system, which is considered as unity. That is, $F = 1.00000$. The individual lens elements are indicated, both in the example tables and in the schematic lens diagrams, by the letter L with a subscript corresponding to the number of the individual lens element as numbered consecutively from front to rear, except that individual elements which together form a single component are given the same numerical subscript with the addition of an alphabetical subscript. The lens components in the front member or section of the lens are indicated by the letters A, B, and M, and also by the Roman numerals I, II, and III, respectively. The elements or components making up the rear member or section of the lens are indicated collectively by the letters RG, and individual elements are indicated also by the Roman numerals IV through VII, as well as by the individual lens element designations $L_4$ through $L_7$. For convenience and clarity of illustration, all lens elements are shown in the diagrams as being separated from each other, but when the space between two adjacent elements is shown in the appropriate data table as being zero, this means that in the preferred practice, those two elements are actually cemented to each other.

The radii of curvature of the front surface and rear surface of each element are indicated respectively by R and R', with an appropriate subscript indicating the number of that particular lens element. Positive values of R or R' indicate surfaces convex toward the front of the lens, and negative values indicate surfaces concave toward the front, in accordance with customary useage in optical patents and other optical literature. As already indicated above, light is assumed to pass from left to right in the diagrams, from a distant object to the left of the objective, through the lens elements, to form an image to the right of the objective, the distance of the image plane from the vertex of the last lens element being indicated at $s'_\infty$.

The axial thicknesses of the individual elements are indicated in the data tables by the letter "$d$" with an appropriate subscript referring to the particular lens element. Spacings between elements are indicated by the letter "$s$" with a subscript corresponding to the identifying number of the lens element in front of and behind this particular space, with some simplification or abbreviation of the subscript where the meaning would still be clear. For example, $s_{1a,b}$ indicates the space between lens element sub $1a$ and lens element sub $1b$, and the notation $s_{12}$ refers to the space between element $L_{1b}$ and element $L_{2a}$. Likewise the notation $s_{23}$ means the space between element $L_{2b}$ and element $L_{3a}$. This form of notation will be clear to those skilled in the art.

The index of refraction of the glass used for each element is shown either by the simple "$n$" with a subscript referring to the individual lens element, or by data in a column headed $n_d$, the latter being used for the sake of compactness when the data also includes the Abbe number or dispersive index in a column headed $\nu_d$.

When an objective is designed for use only in a very narrow spectral range, the refractive index refers specifically to this narrow range. When the lens is designed for use over a wide spectral range, then instead of monochromatic image, error correction, achromatism should be brought about over the wider spectral range required. For this purpose, in known manner, the glasses are to be chosen so that the color dispersion of the glasses used, defined by their corresponding $\nu$ value or Abbe number, serves to eliminate the chromatic errors or deviations due to the wavelengths which enter into consideration.

During the course of making this invention it was found, by way of confirmation, that for the development of the so called initial forms or preforms of the objective, and then in the course of the subsequent technical rough shaping or rough form in known manner with the first correction normally customary in the Seidel range (third order) the use of one of the standard indices of refraction can take place in a purely routine manner. A convenient index for use for this purpose is the index of refraction for the yellow d-line of the helium spectrum, with a wavelength of 5876 Angstrom units. Data for this wavelength are customarily shown in many commercial catalogues issued by manufacturers of optical glasses.

In addition to the values of the linear dimensions and characteristics of the glass, the example tables also indicate, at the top of each table, the intended relative aperture of $f$ number, the total field angle designated as $2w_o$, and the resultant back focus $s'_\infty$, indicated as a proportion of the equivalent focal length F. Also, at the top of each data table there is indicated the particular figure of the lens diagrams which is intended to illustrate this particular example. It should be realized, in this connection, that the lens diagrams are not necessarily drawn to scale, and the spacings, thicknesses, and radii of any particular diagram may not necessarily agree exactly with the data in the example illustrated by that diagram, but the diagrams do illustrate the general arrangement of the lens system or objective of the respective specific examples to which the respective diagrams relate.

A few comments may be given before proceeding with the tabular examples.

Figure 1:
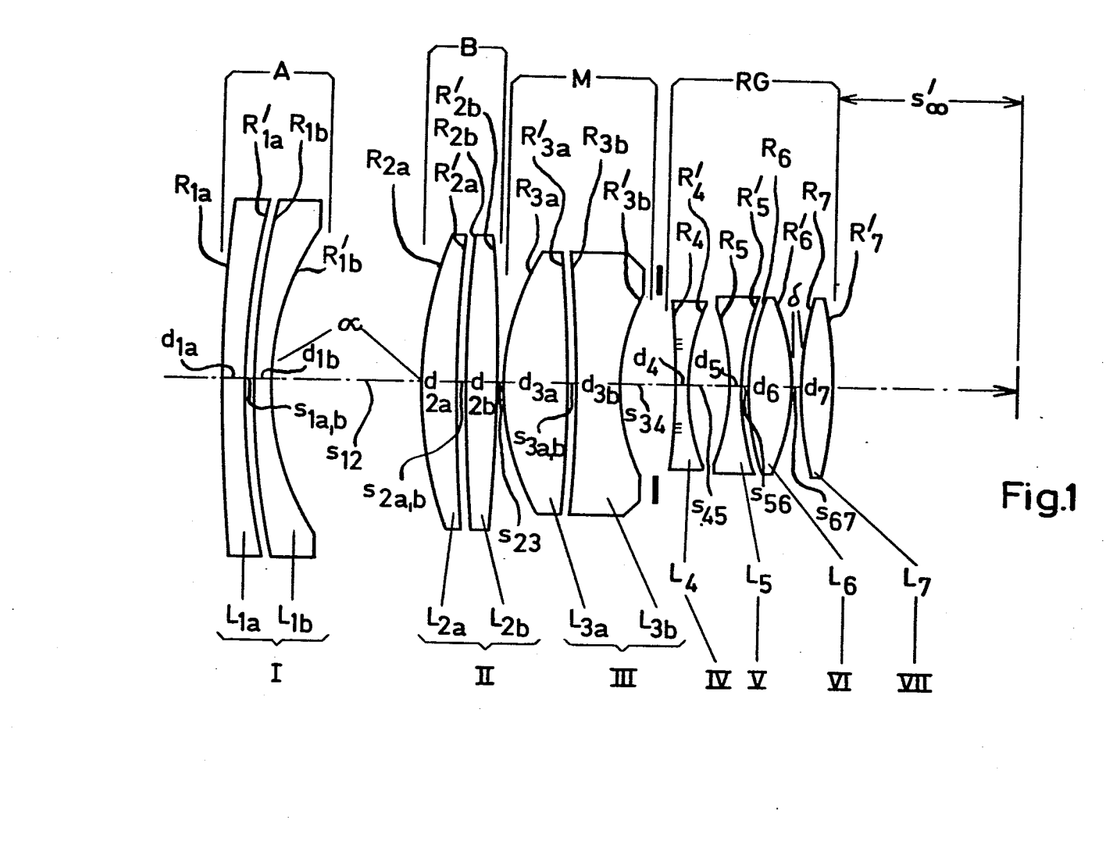
FIG. 1 is a lens diagram illustrating a lens according to one embodiment of the invention.
Figure 2:
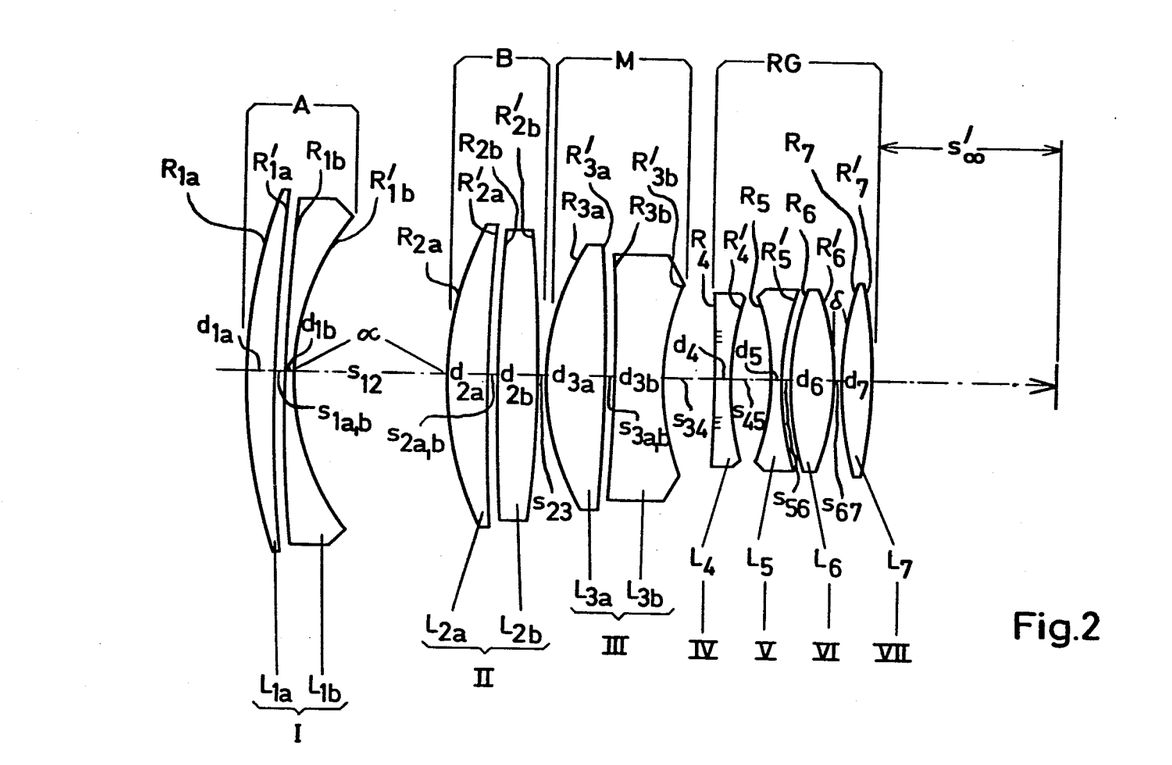
FIGS. 2-6 are similar diagrams illustrating lenses according to other embodiments of the invention.
Figure 3:
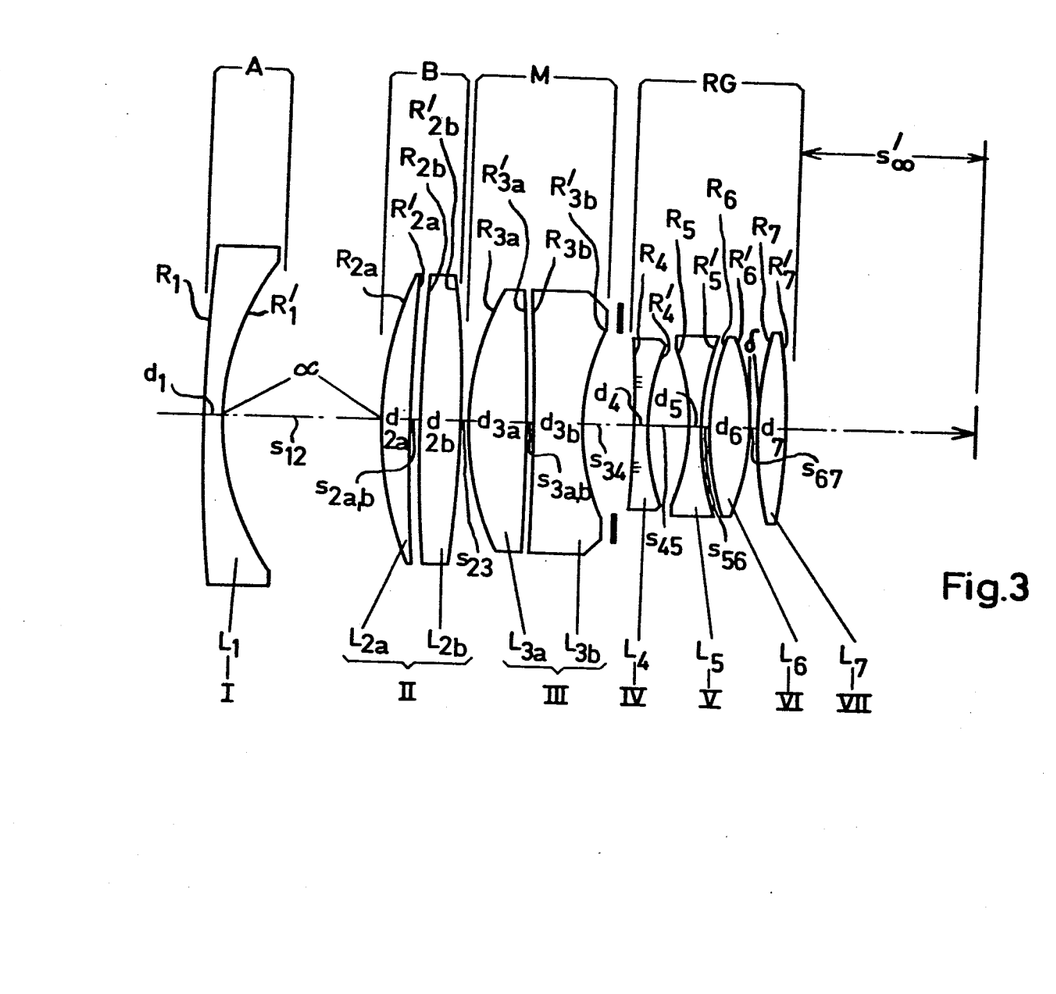
Figure 4:
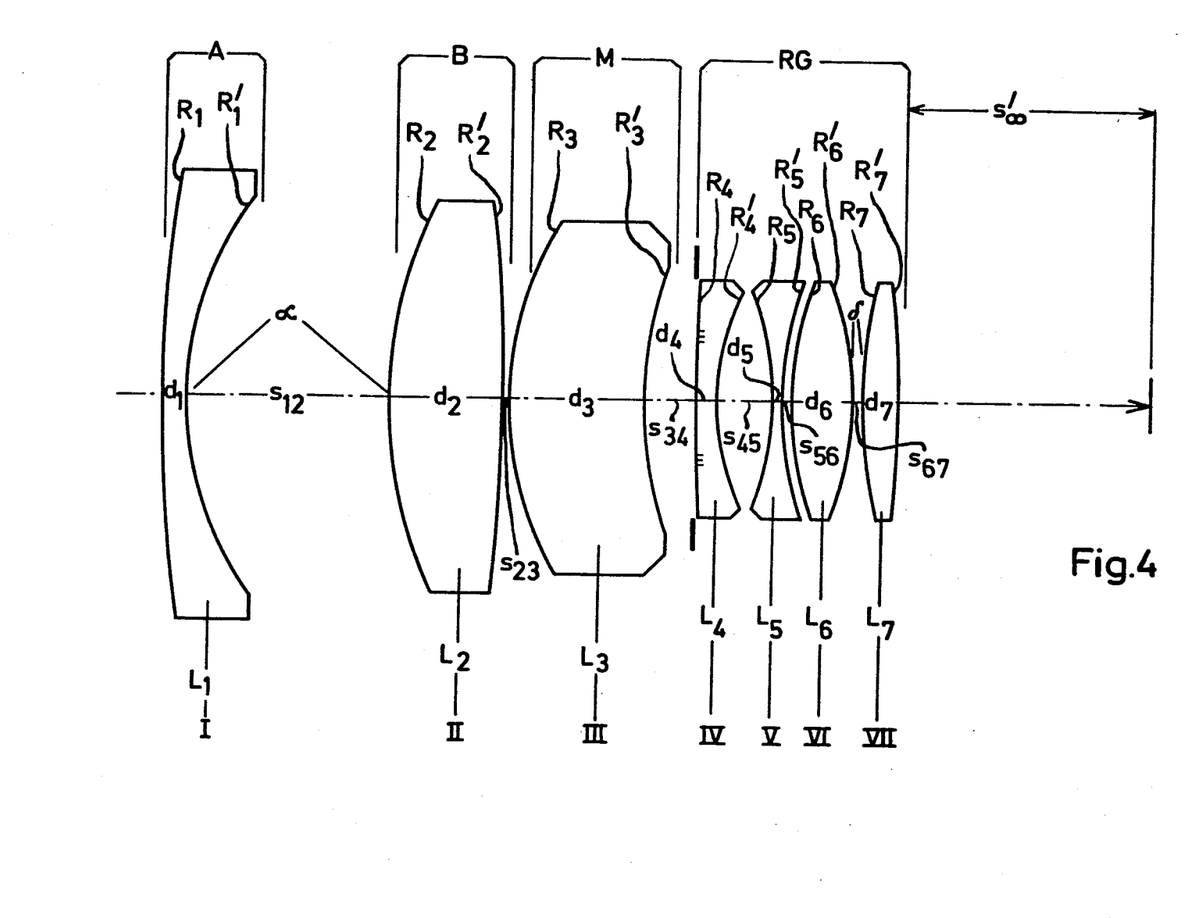
Figure 5:
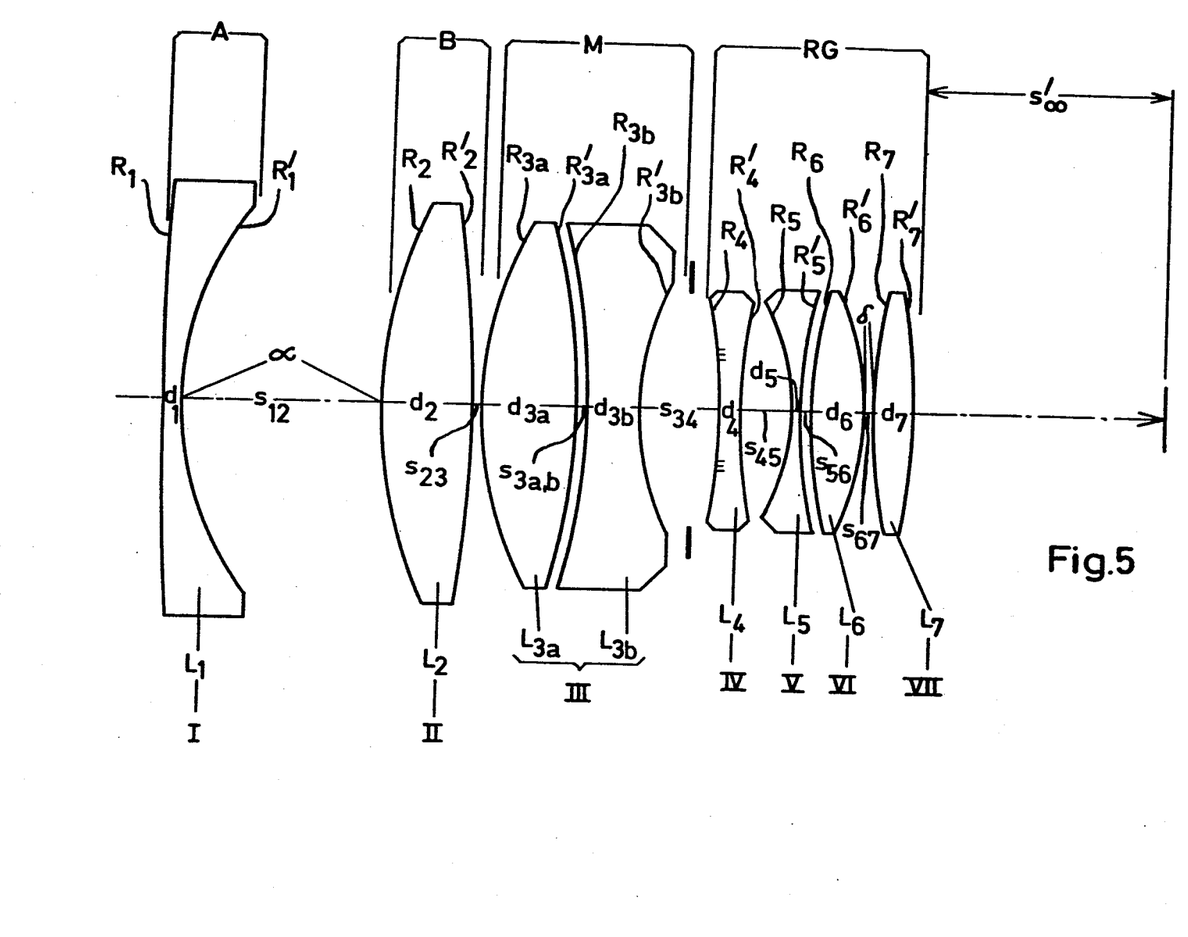
Figure 6:
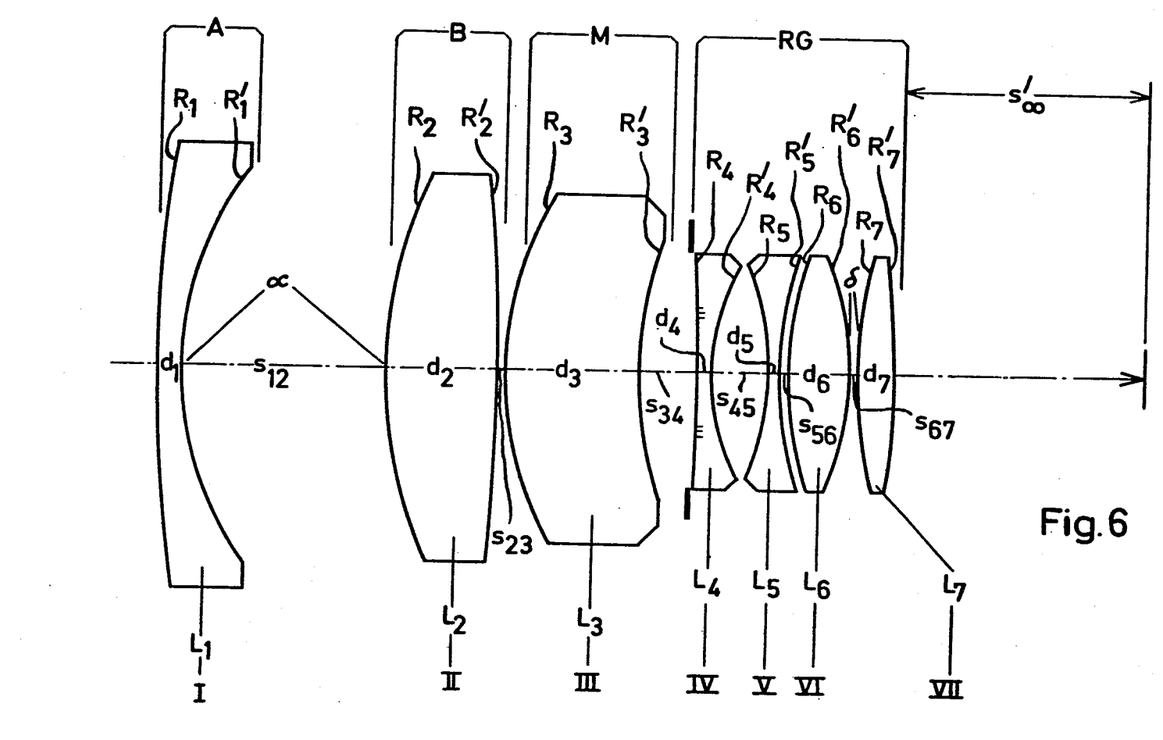

In example 1, illustrated by FIG. 1, the front component A is split into two individual lens components of the same power sign. The following positive component B, as well as the meniscus component M which follows it, are both developed as doublets. In distinction to this, example 2, illustrated by FIG. 2, as a front component A formed as a doublet of two individual lens elements which have opposite signs of power. Example 3, illustrated by FIG. 3, shows a simplified construction in which the front component A consists of only a single individual lens element, then followed by the composite doublets B and M. Both in example 4 (illustrated by FIG. 4) and in example 8 (illustrated by FIG. 6) there is the simplest type of construction, all components being developed as single individual lens elements, with no doublets. In examples 5, 6, and 7, all illustrated by FIG. 5, the meniscus component M is composed of two individual lens elements of opposite sign of power, which can advantgeously be cemented together.

EXAMPLE 1

(Fig. 1)

F = 1.0000    f/1.1251    $2\omega_o$ = 45.5°    $s'_\infty$ = + 0.71796 F

| | Lens | radii | thicknesses and spacings | N |
|---|---|---|---|---|
| A | $L_{1a}$ I $L_{1b}$ | $R_{1a}$ = + 7.20000<br>$R'_{1a}$ = + 2.90000<br>$R_{1b}$ = + 3.10000<br>$R'_{1b}$ = +1.05000 | $d_{1a}$ = 0.80000<br>$s_{1a,b}$ = 0.030000<br>$d_{1b}$ = 0.070000<br>$s_{12}$ = 0.592370 ($\alpha$) | $n_{1a}$ = 1.6204<br>$n_{1b}$ = 1.6180 |
| B | $L_{2a}$ II $L_{2b}$ | $R_{2a}$ = + 1.50065<br>$R'_{2a}$ = + 6.00029 | $d_{2a}$ = 0.132283<br>$s_{2a,b}$ = 0.035000 | $n_{2a}$ = 1.7882 |
| | | $R_{2b}$ = + 6.00029<br>$R'_{2b}$ = + −4.18398<br>$R_{3a}$ = +0.98494<br>$R'_{3a}$ = −14.2180 | $d_{2b}$ = 0.132283<br>$s_{23}$ = 0.002756<br>$d_{3a}$ = 0.239797 | $n_{2b}$ = 1.7882<br>$n_{3a}$ = 1.7882 |

| | | -continued | | |
|---|---|---|---|---|
| F = 1.0000 | f/1.1251 | (Fig. 1)<br>$2\omega_o = 45.5°$ | | $s'_\infty = + 0.71796$ F |
| | Lens | radii | thicknesses and spacings | N |
| M | III $\diagup$ L$_{3_a}$ $\diagdown$ L$_{3_b}$ | | $s3_{a,b} = 0$ | |
| | | $R_{3_b} = - 14.2180$<br>$R'_{3_b} = + 0.85915$ | $d_{3_b} = 0.210863$<br>CS = $s_{34} = 0.204804$ | $n_{3_b} = 1.7173$ |
| IV | L$_4$ | $R_4 = - 51.9475$<br>$R'_4 = + 0.90361$ | $d_4 = 0.052372$<br>$s_{45} = 0.162631$ | $n_4 = 1.5481$ |
| V | L$_5$ | $R_5 = - 0.82289$<br>$R'_5 = + 0.95715$ | $d_5 = 0.041346$<br>$s_{56} = 0$ | $n_5 = 1.7618$ |
| VI | L$_6$ | $R_6 = + 0.95715$<br>$R'_6 = - 0.81680$ | $d_6 = 0.206680$<br>$s_{67} = 0.002756 (\infty)$ | $n_6 = 1.7882$ |
| LP = VII | L$_7$ | $R_7 = + 1.46297$<br>$R'_7 = - 2.14303$ | $d_7 = 0.121000$ | $n_7 = 1.7882$ |

RG

EXAMPLE 2

| | | | (FIG. 2) | | |
|---|---|---|---|---|---|
| F = 1.00000 | | f/1.251 | $2\omega_o = 45.5°$ | | $s'_\infty = + 0.71796$ F |
| | Lens | radii | thicknesses and spacings | N | |
| A | I $\diagup$ L$_{1_a}$ $\diagdown$ L$_{1_b}$ | $R_{1_a} = + 6.89250$<br>$R'_{1_a} = + 12.6160$<br>$R_{1_b} = + 14.2180$<br>$R'_{1_b} = + 1.04932$ | $d_{1_a} = 0.15481$<br>$s_{1_{a,b}} = 0.02489$<br>$d_{1_b} = 0.07030$ | $n_{1_a} = 1.5481$<br>$n_{1_b} = 1.6177$ | |
| B | II $\diagup$ L$_{2_a}$ $\diagdown$ L$_{2_b}$ | $R_{2_a} = + 1.51031$<br>$R'_{2_a} = + 5.91440$<br>$R_{2_b} = + 6.06707$<br>$R'_{2_b} = - 4.21976$ | $s_{12} = 0.63893 (\alpha)$<br>$d_{2_a} = 0.17750$<br>$s_{2_{a,b}} = 0.04000$<br>$d_{2_b} = 0.16525$ | $n_{2_a} = 1.7750$<br>$n_{2_b} = 1.7950$ | |
| M | III $\diagup$ L$_{3_a}$ $\diagdown$ L$_{3_b}$ | $R_{3_a} = + 0.98495$<br>$R'_{3_a} = - 14.2180$<br>$R_{3_b} = - 14.2180$<br>$R'_{3_b} = + 0.85877$ | $s_{23} = 0.002756$<br>$d_{3_a} = 0.23980$<br>$s_{3_{a,b}} = 0$<br>$d_{3_b} = 0.21082$ | $n_{3_a} = 1.7882$<br>$n_{3_b} = 1.7170$ | |
| IV | L$_4$ | $R_4 = - 51.97363$<br>$R'_4 = + 0.90361$ | CS = $s_{34} = 0.20481$<br>$d_4 = 0.05237$ | $n_4 = 1.5481$ | |
| V | L$_5$ | $R_5 = - 0.82289$<br>$R'_5 = + 0.95715$ | $s_{45} = 0.16263$<br>$d_5 = 0.04135$ | $n_5 = 1.7618$ | |
| VI | L$_6$ | $R_6 = + 0.95715$<br>$R'_6 = - 0.81680$ | $s_{56} = 0$<br>$d_6 = 0.20668$ | $n_6 = 1.7882$ | RG |
| LP = VII | L$_7$ | $R_7 = + 1.46297$<br>$R'_7 = - 2.14263$ | $s_{67} = 0.00276 (\delta)$<br>$d_7 = 0.12128$ | $n_7 = 1.7882$ | |

EXAMPLE 3

| | | | (Fig. 3) | | |
|---|---|---|---|---|---|
| F = 1.00000 | | f/1.24 | $2\omega_o = 44°$ | | $s'_\infty = + 0.71784$ F |
| | Lens | radii | thicknesses and spacings | N | |
| A | I L$_1$ | $R_1 = + 7.76825$<br>$R'_1 = + 1.05870$ | $d_1 = 0.070290$<br>$s_{12} = 0.606421 (\alpha)$ | $n_1 = 1.61772$ | |

-continued

| | | | | (Fig. 3) | | |
|---|---|---|---|---|---|---|
| F = 1.00000 | | | f/1.24 | $2\omega_o = 44°$ | | $s'_\infty = + 0.71784\ F$ |
| | | | Lens radii | thicknesses and spacings | N | |
| B | II | $L_{2_a}$ | $R_{2_a} = + 1.52799$<br>$R'_{2_a} = + 6.01587$ | $d_{2_a} = 0.100000$<br>$s_{2_{a,b}} = 0.040000$ | $n_{2_a} = 1.78831$ | |
| | | $L_{2_b}$ | $R_{2_b} = + 6.01587$<br>$R'_{2_b} = - 4.18430$ | $d_{2_b} = 0.164620$<br>$s_{23} = 0.002756$ | $n_{2_b} = 1.78831$ | |
| M | III | $L_{3_a}$ | $R_{3_a} = + 0.98508$<br>$R'_{3_a} = - 14.2181$ | $d_{3_a} = 0.239812$<br>$s_{3_{a,b}} = 0$ | $n_{3_a} = 1.78831$ | |
| | | $L_{3_b}$ | $R_{3_b} = - 14.2181$<br>$R'_{3_b} = + 0.85922$ | $d_{3_b} = 0.210869$ | $n_{3_b} = 1.71736$ | |
| | | | | CS = $s_{34} = 0.204805$ | | |
| | IV | $L_4$ | $R_4 = - 51.95935$<br>$R'_4 = + 0.90368$ | $d_4 = 0.052373$<br>$s_{45} = 0.162631$ | $n_4 = 1.54814$ | |
| | V | $L_5$ | $R_5 = - 0.82289$<br>$R'_5 = + 0.95715$ | $d_5 = 0.041347$<br>$s_{56} = 0$ | $n_5 = 1.76180$ | RG |
| | VI | $L_6$ | $R_6 = +0.95715$<br>$R'_6 = - 0.81701$ | $d_6 = 0.206734$<br>$s_{67} = 0.002756\ (\delta)$ | $n_6 = 1.78831$ | |
| LP = | VII | $L_7$ | $R_7 = + 1.46318$<br>$R'_7 = - 2.14293$ | $d_7 = 0.121284$ | $n_7 = 1.78831$ | |

EXAMPLE 4

| | | | | (FIG. 4) | | |
|---|---|---|---|---|---|---|
| F = 1.00000 | | | f/1.21 | $2\omega_o = 45°$ | | $s'_\infty = + 0.71429F$ |
| | | | Lens radii | thicknesses and spacings | N | |
| A | I | $L_1$ | $R_1 = + 4.53990$<br>$R'_1 = + 1.00221$ | $d_1 = 0.068682$<br>$s_{12} = 0.592560\ (a)$ | $n_1 = 1.67250$ | |
| B | II | $L_2$ | $R_2 = + 1.36189$<br>$R'_2 = - 4.22752$ | $d_2 = 0.335195$<br>$s_{23} = 0.002830$ | $n_2 = 1.78705$ | |
| M | III | $L_3$ | $R_3 = + 0.95494$<br>$R'_3 = + 1.14955$ | $d_3 = 0.400773$ | $n_3 = 1.7822$ | |
| | | | | CS = $s_{34} = 0.164177$ | | |
| | IV | $L_4$ | $R_4 = + 6.75332$<br>$R'_4 = + o.66855$ | $d_4 = 0.044204$<br>$s_{45} = 0.172282$ | $n_4 = 1.58279$ | |
| | V | $L_5$ | $R_5 = - o.79570$<br>$R'_5 = + 0.96306$ | $d_5 = 0.030467$<br>$s_{56} = O$ | $n_5 = 1.83037$ | RG |
| | VI | $L_6$ | $R_6 = + 0.96306$<br>$R'_6 = - 0.778469$ | $d_6 = 0.209150$<br>$s_{67} = 0.002747\ (\delta)$ | $n_6 = 1.78826$ | |
| LP= | VII | $L_7$ | $R_7 = + 1.28382$<br>$R'_7 = - 2.34904$<br>$R'_7 = - 2.34904$ | $d_7 = 0.111430$ | $n_7 = 1.78830$ | |

EXAMPLE 5

| | | | (FIG. 5) | | |
|---|---|---|---|---|---|
| | | F = 1.00000 | f/1.24 $2\omega_o = 45.5°$ | $s'_\infty = + 0.71784\ F$ | |
| | | | Lens radii | thicknesses and spacings | $n_d/\nu_d$ |
| A | I | $L_1$ | $R_1 = + 7.76825$<br>$R'_1 = + 1.05870$ | $d_1 = 0.070290$<br>$s_{12} = 0.606421\ (a)$ | 1.61772/49.78 |
| B | II | $L_2$ | $R_2 = + 1.52799$<br>$R'_2 = -4.18431$ | $d_2 = 0.264620$<br>$s_{23} = 0.002756$ | 1.78831/47.37 |
| | | | $R_{3_a} = + 0.98508$ | | |

-continued (FIG. 5)
$F = 1.00000 \; f/1.24 \; 2\omega_o = 45.5° \; s'_\infty = +0.71784 \; F$

| | | Lens | radii | thicknesses and spacings | $n_d/\nu_d$ |
|---|---|---|---|---|---|
| M | III | $L_{3a}$ | $R'_{3a} = -14.21809$ | $d_{3a} = 0.239812$ | 1.78831/47.37 |
| | | | $R_{3b} = -14.21809$ | $s_{3a,b} = 0$ | |
| | | $L_{3b}$ | $R'_{3b} = +0.85922$ | $d_{3b} = 0.210869$ | 1.71736/29.52 |
| | | | | $CS = s_{34} = 0.204805$ | |
| | IV | $L_4$ | $R_4 = -51.95926$ | $d_4 = 0.052373$ | 1.54814/45.75 |
| | | | $R'_4 = +0.90368$ | $s_{45} = 0.162631$ | |
| | V | $L_5$ | $R_5 = -0.82289$ | $d_5 = 0.041347$ | 1.76180/26.95 |
| | | | $R'_5 = +0.95715$ | $s_{56} = 0$ | RG |
| | VI | $L_6$ | $R_6 = 0.95715$ | $d_6 = 0.206734$ | 1.78831/47.37 |
| | | | $R'_6 = -0.81701$ | $s_{67} = 0.002756 \; (\delta)$ | |
| LP = | VII | $L_7$ | $R_7 = +1.46318$ | $d_7 = 0.121284$ | 1.78831/47.37 |
| | | | $R'_7 = -2.14293$ | | |

EXAMPLE 6

$F = 1.00000 \quad f/1.21 \quad$ (FIG. 5) $\; 2\omega_o = 45.5° \quad s'_\infty = +0.73146 \; F$

| | | Lens | radii | thicknesses and spacings | $n_d/\nu_d$ |
|---|---|---|---|---|---|
| A | I | $L_1$ | $R_1 = +15.57624$ | $d_1 = 0.057607$ | 1.62299/58.06 |
| | | | $R'_1 = +0.97577$ | $s_{12} = 0.597141 \; (\alpha)$ | |
| B | II | $L_2$ | $R_2 = +1.42875$ | $d_2 = 0.271172$ | 1.78831/47.37 |
| | | | $R'_1 = -3.96903$ | $s_{23} = 0.005620$ | |
| M | III | $L_{3a}$ | $R_{3a} = +0.98993$ | $d_{3a} = 0.321753$ | 1.78831/47.37 |
| | | | $R'_{3a} = -2.34756$ | $s_{3a,b} = 0$ | |
| | | $L_{3b}$ | $R_{3b} = -2.34756$ | $d_{3b} = 0.160174$ | 1.72830/28.68 |
| | | | $R'_{3b} = +0.76948$ | | |
| | | | | $CS = s_{34} = 0.244476$ | |
| | IV | $L_4$ | $R_4 \; 32 - 3.69407$ | $d_4 = 0.061822$ | 1.60859/46.46 |
| | | | $R'_4 = +1.87809$ | $s_{45} = 0.147529$ | |
| | V | $L_5$ | $R_5 = -0.73689$ | $d_5 = 0.044961$ | 1.78470/26.08 |
| | | | $R'_5 = +1.83793$ | $s_{56} = 0$ | RG |
| | VI$\Delta L_6$ | | $R_6 = +1.83793$ | $d_6 = 0.185465$ | 1.78831/47.37 |
| | | | $R'_6 - 0.74765$ | $s_{67} \; 0.002810 \; (\gamma)$ | |
| LP = | VII | $L_7$ | $R_7 + +1.50255$ | $d_7 = 0.122238$ | 1.78831/47.37 |
| | | | $R'_7 = -2.10716$ | | |

EXAMPLE 7

$F = 1.00000 \quad f/1.20 \quad$ (Fig. 5) $\; 2\omega_o = 45.5° \quad s'_\infty = +0.73079 \; F$

| | | Lens | radii | thicknesses and spacings | $n_d/\nu_d$ |
|---|---|---|---|---|---|
| A | I | $L_1$ | $R_1 = +18.89009$ | $d_1 = 0.064575$ | 1.56873/63.12 |
| | | | $R'_1 = +0.98899$ | $s_{12} = 0.575133 \; (\alpha)$ | |
| B | II | $L_2$ | $R_2 = +1.60180$ | $d_2 = 0.309137$ | 1.78443/43.90 |
| | | | $R'_2 = -2.86893$ | $s_{23} = 0.002748$ | |

-continued (Fig. 5)
$F = 1.00000$  $f/1.20$  $2\omega_o = 45.5°$  $s'_\infty = + 0.73079\ F$

| | | Lens | radii | thicknesses and spacings | $n_d/\nu_d$ |
|---|---|---|---|---|---|
| M | III | $L_{3_a}$ | $R'_{3_a} = + 0.90087$ | | |
| | | | $R'_{3_a} = - 5.10170$ | $d_{3_a} = 0.273415$ | 1.68900/49.46 |
| | | | $R_{3_b} = - 5.10170$ | $s_{3_a,b} = 0$ | |
| | | $L_{3_b}$ | $R'_{3_b} = + 0.82618$ | $d_{3_b} = 0.212961$ | 1.78470/26.08 |
| | | | | $CS = s_{34} = 0.229449$ | |
| | IV | $L_4$ | $R_4 = - 28.30325$ | $d_4 = 0.054133$ | 1.54814/45.75 |
| | | | $R'_4 = + 0.99630$ | $s_{45} = 0.148386$ | |
| | V | $L_5$ | $R_5 = - 0.77446$ | $d_5 = 0.032975$ | 1.74080/28.09 |
| | | | $R'_5 = + 1.18404$ | $s_{56} = 0$ | RG |
| | VI | $L_6$ | $R_6 = + 1.18404$ | $d_6 = 0.197848$ | 1.78831/47.37 |
| | | | $R'_6 = - 0.79703$ | $s_{67} = 0.002748\ (\delta)$ | |
| LP = | VII | $L_7$ | $R_7 = + 1.34773$ | $d_7 = 0.122281$ | 1.78831/47.37 |
| | | | $R'_7 = - 2.12082$ | | |

EXAMPLE 8

$F = 1.00000$  $f/1.20$  (FIG. 6) $2\omega_o = 46°$  $s'_\infty = + 0.72236\ F$

| | | Lens | radii | thicknesses and spacings | $n_d/\nu_d$ |
|---|---|---|---|---|---|
| A | I | $L_1$ | $R_1 = + 5.19539$ | $d_1 = 0.063439$ | 1.68893/31.17 |
| | | | $R'_1 = + 0.97859$ | $s_{12} = 0.605430\ (\alpha)$ | |
| B | II | $L_2$ | $R_2 = + 1.44340$ | $d_2 = 0.270306$ | 1.78831/47.37 |
| | | | $R'_2 = - 3.52283$ | $s_{23} = 0.002758$ | |
| M | III | $L_3$ | $R_3 = 1.00005$ | $d_3 = 0.477172$ | 1.78831/47.37 |
| | | | $R'_3 = + 0.095092$ | $CS = s_{34}\ 0.193075$ | |
| | IV | $L_4$ | $R_4 = - 9.10709$ | $d_4 = 0.048269$ | 1.52341/51.47 |
| | | | $R'_4 = + 0.90426$ | $s_{45} = 0.147565$ | |
| | V | $L_5$ | $R_5 = - 0.91722$ | $d_5 = 0.030340$ | 1.84666/23.82 |
| | | | $R'_5 = + 0.83541$ | $s_{56} = 0$ | RG |
| | VI | $L_6$ | $R_6 = + 0.83541$ | $d_6 = 0.217899$ | 1.78831/47.37 |
| | | | $R'_6 = - 0.82929$ | $s_{67} = 0.002758\ (\delta)$ | |
| LP = | VII | $L_7$ | $R_7 = + 1.24989$ | $d_7 = 0.121362$ | 1.78831/47.37 |
| | | | $R'_7 = - 2.49393$ | | |

It will be noted that in the foregoing tables the space $s_{34}$ between component III and component IV is also designated by the letters CS. This stands for "central space," and refers to the space where as diaphragm would be located, if a diaphragm is used in the objective.

The new objective of the present invention is excellently suitable for provision of at least one aspherical surface if desired. According to this invention, if an aspherical surface is to be used, it preferably is placed as near as possible to the diaphragm or stop, that is, as near as possible to the above mentioned central space. Thus it will be on a lens of relatively small diameter.

In practical use, the deformed or aspherical surface could be on any desired lens surface, preferably near the central space, as above mentioned. However, for the sake of a uniform comparison in the above examples, the front surface of the first negative component in the rear member of the lens (that is, the front surface of element $L_4$) has been selected as the surface to receive the aspherical shape. The aspherical shape is determined by the well known camber expression:

$$P = c_1 \cdot H^2 + c_2 \cdot H^4 + c_3 \cdot H^6 + c_4 \cdot H^8 + c_5 \cdot H^{10},$$

in this camber expression, H is the height of the perpendicular to the optical axis at the corresponding point of passage through the surface. In all cases, $R_4$ is the vertex radius of the aspherical surface. Thus $c_1 = (2R_4)^{-1}$ applies strictly. The other values of the coefficient "c" are as given in the following table.

| Example | $c_2$ | $c_3$ | $c_4 = c_5$ |
|---|---|---|---|
| 1 | $-1.148\,2231 \cdot 10^0$ | 0 | 0 |
| 2 | $-1.148\,2231 \cdot 10^0$ | 0 | 0 |
| 3 | $-1.148\,2231 \cdot 10^0$ | 0 | 0 |
| 4 | $-8.327\,1291 \cdot 10^{-1}$ | 0 | 0 |
| 5 | $-1.148\,2254 \cdot 10^0$ | 0 | 0 |
| 6 | $-1.209\,3393 \cdot 10^0$ | $-1.425\,3367 \cdot 10^0$ | 0 |
| 7 | $-1.064\,6064 \cdot 10^0$ | $-6.698\,0636 \cdot 10^{-1}$ | 0 |
| 8 | $-9.954\,6189 \cdot 10^{-1}$ | 0 | 0 |

A further feature of the present invention relates to the meniscus component M or III. In the case of an objective of this type with a very high relative aperture, and particularly in order to relieve errors of the tangential (Meridional) course of the image shell in the lateral field of view, this meniscus component is made with a total thickness of more than one-third of the equivalent focal length of the entire objective, and also it is developed as a doublet the inner neighboring pair of surfaces of which have a difference in refractive indices of more than 0.066 for the standard wavelength of 5876 Angstrom units. In this connection, instead of calculating the sum of the surface refractive power for this component M which can be calculated in simpler manner, the boundary layer region, with due consideration of the lens thicknesses and the difference dioptric effect of the glasses used in such a doublet, is now to be referred to the paraxial specific refractive power ($\Phi_M$) of this component. In specific example 7, the specific refractive power of this meniscus component M satisfies the desirable condition that it is less than 0.16 times the equivalent refractive power of the entire objective. In this example 7, the paraxial specific refractive power of the doublet component M, as calculated by digital electronic calculation, rounded off to seven places, actually is $+0.0009998\,\Phi$.

In Table I below, the most important lens refractive powers ($\phi$) for the absolute values of the air lens $\alpha$ and the components B, M, IV, and V are given, rounded off to five places, for each of the eight examples above given. The column headings explain which values are given in each column. The second column, just to the right of the column giving the example numbers, merely contains factory identification numbers for the various lenses corresponding to the various specific examples.

Table II below gives the refractive powers stated as the sum of the corresponding surface refractive powers for the components LP and A, as well as for the air lens $\delta$. Also, in the next to the last vertical column, there is indicated the absolute value of the quotient Q as one of the individual features of this invention. All of these figures have been rounded off to five places, as a result of calculation by digital electronic procedures to a larger number of places. Table II also has a column showing the intended relative aperture or f number for each example.

In considering the various numerical values given in these tables and elsewhere, it should be borne in mind that customarily a tolerance of plus or minus 5% is allowable.

Table I

| Example | Objective 1459— | $|\phi_a|$ | $\phi_B$ | $|\phi_M|$ | $|\phi_{IV}|$ | $|100\,\nu|$ |
|---|---|---|---|---|---|---|
| 1 | 1189 00 | 0.06333 $\Phi$ | 0.71363 $\Phi$ | 0.02966 $\Phi$ | 0.61712 $\Phi$ | 1.72167 $\Phi$ |
| 2 | 1189 0 | 0.07570 $\Phi$ | 0.70136 $\Phi$ | 0.02966 $\Phi$ | 0.61711 $\Phi$ | 1.72167 $\Phi$ |
| 3 | 1189 I | 0.06756 $\Phi$ | 0.70431 $\Phi$ | 0.02966 $\Phi$ | 0.01711 $\Phi$ | 1.72167 $\Phi$ |
| 4 | 1071 | 0.09310 $\Phi$ | 0.76408 $\Phi$ | 0.13974 $\Phi$ | 0.48543 $\Phi$ | 1.90579 $\Phi$ |
| 5 | 1189 | 0.06756 $\Phi$ | 0.70431 $\Phi$ | 0.02965 $\Phi$ | 0.61712 $\Phi$ | 1.72167 $\Phi$ |
| 6 | 1198 | 0.08671 $\Phi$ | 0.75036 $\Phi$ | 0.12459 $\Phi$ | 0.48890 $\Phi$ | 1.49183 $\Phi$ |
| 7 | 1199 | 0.08534 $\Phi$ | 0.76314 $\Phi$ | 0.20373 $\Phi$ | 0.56954 $\Phi$ | 1.58219 $\Phi$ |
| 8 | 980 | 0.15786 $\Phi$ | 0.76992 $\Phi$ | 0.04072 $\Phi$ | 0.63630 $\Phi$ | 1.93654 $\Phi$ |

Table II

| Example | Objective 1459— | f/m | $\phi_{LP} \div \phi_A =$ | $|Q|$ | $\phi_\delta$ |
|---|---|---|---|---|---|
| 1 | 1189 00 | 1.25 | $+0.90656\,\Phi\ -0.51698\,\Phi$ | 1.75357 | $+1.50375\,\Phi$ |
| 2 | 1189 0 | 1.24 | $+0.90662\,\Phi\ -0.50914\,\Phi$ | 1.78069 | $+1.50374\,\Phi$ |
| 3 | 1189 I | 1.24 | $+0.90663\,\Phi\ -0.50395\,\Phi$ | 1.79905 | $+1.50364\,\Phi$ |
| 4 | 1071 | 1.21 | $+0.94961\,\Phi\ -0.52288\,\Phi$ | 1.81611 | $+1.61858\,\Phi$ |
| 5 | 1189 | 1.23 | $+0.90663\,\Phi\ -0.50395\,\Phi$ | 1.79905 | $+1.50363\,\Phi$ |
| 6 | 1198 | 1.22 | $+0.89876\,\Phi\ -0.59846\,\Phi$ | 1.50179 | $+1.57904\,\Phi$ |
| 7 | 1199 | 1.20 | $+0.95662\,\Phi\ -0.54495\,\Phi$ | 1.75543 | $+1.57398\,\Phi$ |
| 8 | 980 | 1.21 | $+0.94680\,\Phi\ -0.57140\,\Phi$ | 1.65698 | $+1.58129\,\Phi$ |

What is claimed is:

1. A very high speed lens with wide angular field of view, comprising, in succession from front to rear,
    (1) a first component (A) of negative power, said first component including all lens elements located in front of the below mentioned second component, the most strongly curved air-contacting surface of said first component being the rear surface of such component and being concave toward the rear,
    (2) a second component (B) of positive power, spaced rearwardly from said first component to provide an air lens ($\alpha$) between them,
    (3) a meniscus component (M) having front and rear surfaces both convex toward the front, and
    (4) a rear member (RG) having, in succession,
        (i) a first negative element (IV),
        (ii) a second negative element (V),
        (iii) a third positive element (VI), and
        (iv) a fourth positive element (VII, LP)
    said lens also having the features that
    (5) said air lens ($\alpha$) between said first and second components has front and rear surfaces which are of unequal curvature and both of which are convex toward the front,
    (6) the sum of the surface refractive powers of said first negative element (IV) is not more than 0.90 times the sum of the surface refractive powers of said second negative element (V), (7) said third positive element (VI) is close to said second negative element (V), (8) said fourth positive element (VIII) is spaced rearwardly from said third positive element (VI) to provide an air lens (δ) between them, and (9) the sum of the surface refractive powers of said first mentioned air lens (α) is less than 0.185 times the total equivalent refractive power (Φ) of the entire lens system, said lens being characterized by the novel features that (a) the absolute numerical value of the quotient (Q) of the paraxial refractive power ($\phi_{LP}$) of said fourth positive element (VII, LP) divided by the sum of the refractive powers of all surfaces of said first negative component (A) is within the limits of 1.370 and 2.015, and (b) the air lens refractive power of said air lens (δ) in said rear member (RG) is within the limits of 1.370 and 1.795 times the total equivalent refractive power (Φ) of the entire lens system.

2. A lens as defined in claim 1, wherein (a) said meniscus component (M) comprises two lens elements made of glasses having refractive indices, for the yellow spectral line of helium light of wavelength 5876 Angstrom units, which differ from each other by not less than 0.066, and (b) the individual refractive powers of said two lens elements are so chosen that the absolute value of the refractive power of said meniscus component is not more than 0.16 times the total equivalent refractive power of the entire lens system.

3. A lens as defined in claim 1, wherein the characteristics of the lens components and their spatial relationship to each other are substantially in the proportions indicated by the data in the following table, all linear dimensions of radii, thicknesses, and spacings being expressed in proportion to the equivalent focal length of the entire lens system, which is considered as unity:

| | | | F = 1.00000 | f/1.25 | $2\omega_o$ = 45.5° | $s'_\infty$ = + 0.71796 F |
|---|---|---|---|---|---|---|
| | | Lens | radii | thicknesses and spacings | | N |
| A | I | $L_{1a}$ | $R_{1a}$ = + 7.20000 | $d_{1a}$ = 0.080000 | | $n_{1a}$ = 1.6204 |
| | | | $R'_{1a}$ = + 2.90000 | $s_{1a,b}$ = 0.030000 | | |
| | | $L_{1b}$ | $R_{1b}$ = + 3.10000 | $d_{1b}$ = 0.070000 | | $n_{1b}$ = 1.6180 |
| | | | $R'_{1b}$ = + 1.05000 | $s_{12}$ = 0.592370 | (α) | |
| B | II | $L_{2a}$ | $R_{2a}$ = + 1.50065 | $d_{2a}$ = 0.132283 | | $n_{2a}$ = 1.7882 |
| | | | $R'_{2a}$ = + 6.00029 | $s_{2a,b}$ = 0.035000 | | |
| | | $L_{2b}$ | $R_{2b}$ = + 6.00029 | $d_{2b}$ = 0.132283 | | $n_{2b}$ = 1.7882 |
| | | | $R'_{2b}$ = − 4.18398 | $s_{23}$ = 0.002756 | | |
| M | III | $L_{3a}$ | $R_{3a}$ = + 0.98494 | $d_{3a}$ = 0.239797 | | $n_{3a}$ = 1.7882 |
| | | | $R'_{3a}$ = − 14.2180 | $s_{3a,b}$ = 0 | | |
| | | $L_{3b}$ | $R_{3b}$ = − 14.2180 | $d_{3b}$ = 0.210863 | | $n_{3b}$ = 1.7173 |
| | | | $R'_{3b}$ = + 0.85915 | CS = $s_{34}$ = 0.204804 | | |
| | IV | $L_4$ | $R_4$ = − 51.9475 | $d_4$ = 0.052372 | | $n_4$ = 1.5481 |
| | | | $R'_4$ = + 0.90361 | $s_{45}$ = 0.162631 | | |
| | V | $L_5$ | $R_5$ = − 0.82289 | $d_5$ = 0.041346 | | $n_5$ = 1.7618  RG |
| | | | $R'_5$ = + 0.95715 | $s_{56}$ = 0 | | |
| | VI | $L_6$ | $R_6$ = + 0.95715 | $d_6$ = 0.206680 | | $n_6$ = 1.7882 |
| | | | $R'_6$ = − 0.81680 | $s_{67}$ = 0.002756 | (δ) | |
| LP = | VII | $L_7$ | $R_7$ = + 1.46297 | $d_7$ = 0.121000 | | $n_7$ = 17882 |
| | | | $R'_7$ = − 2.14303 | | | |

4. A lens as defined in claim 1, wherein the characteristics of the lens components and their spatial relationship to each other are substantially in the proportions indicated by the data in the following table, all linear dimensions of radii, thicknesses, and spacings being expressed in proportion to the equivalent focal length of the entire lens system, which is considered as unity:

| | | | F = 1.00000 | f/1.25 | $2\omega_o = 43°$ | $s'_\infty = +0.71784F$ | |
|---|---|---|---|---|---|---|---|
| | | Lens | | radii | thicknesses and spacings | N | |
| A | I | $L_{1a}$ | | $R_{1a} = +6.89250$ | | | |
| | | | | $R'_{1a} = +12.6160$ | $d_{1a} = 0.15481$ | $n_{1a} = 1.5481$ | |
| | | | | $R_{1b} = +14.2180$ | $s_{1a,b} = 0.02489$ | | |
| | | | | | $d_{1b} = 0.07030$ | $n_{1b} = 1.6177$ | |
| | | $L_{1b}$ | | $R'_{1b} = +1.04932$ | | | |
| | | | | | $s_{12} = 0.63893$ (α) | | |
| B | II | $L_{2a}$ | | $R_{2a} = +1.51081$ | | | |
| | | | | $R'_{2a} = +5.91440$ | $d_{2a} = 0.17750$ | $n_{2a} = 1.7750$ | |
| | | | | $R_{2b} = +6.06707$ | $s_{2a,b} = 0.04000$ | | |
| | | | | | $d_{2b} = 0.16525$ | $n_{2b} = 1.7950$ | |
| | | $L_{2b}$ | | $R'_{2b} = -4.21976$ | | | |
| | | | | | $s_{23} = 0.002756$ | | |
| M | III | $L_{3a}$ | | $R_{3a} = +0.98495$ | | | |
| | | | | $R'_{3a} = -14.2180$ | $d_{3a} = 0.23980$ | $n_{3a} = 1.7882$ | |
| | | | | $R_{3b} = -14.2180$ | $s_{3a,b} = 0$ | | |
| | | | | | $d_{3b} = 0.21082$ | $n_{3b} = 1.7170$ | |
| | | $L_{3b}$ | | $R'_{3b} = +0.85877$ | | | |
| | | | | | CS = $s_{34} = 0.20481$ | | |
| | IV | $L_4$ | | $R_4 = -51.97363$ | | | |
| | | | | $R'_4 = +0.90361$ | $d_4 = 0.05237$ | $n_4 = 1.5481$ | |
| | | | | | $s_{45} = 0.16263$ | | |
| V | | $L_5$ | | $R_5 = -0.82289$ | | | |
| | | | | $R'_5 = +0.95715$ | $d_5 = 0.04135$ | $n_5 = 1.7618$ | RG |
| | | | | | $s_{56} = 0$ | | |
| | VI | $L_6$ | | $R_6 = +0.95715$ | | | |
| | | | | $R'_6 = -0.81680$ | $d_6 = 0.20668$ | $n_6 = 1.7882$ | |
| | | | | | $s_{67} = 0.00276$ (δ) | | |
| LP = | VII | $L_7$ | | $R_7 = +1.46299$ | | | |
| | | | | $R'_7 = -2.14263$ | $d_7 = 0.12128$ | $n_7 = 1.7882$ | |

5. A lens as defined in claim 1, wherein the characteristics of the lens components and their spatial relationship to each other are substantially in the proportions indicated by the data in the following table, all linear dimensions of radii, thicknesses, and spacings being expressed in proportion to the equivalent focal length of the entire lens system, which is considered as unity:

| | | | F = 1.00000 f/1.24 $2\omega_o = 44°$ $s'_\infty = +0.71784$ F | | |
|---|---|---|---|---|---|
| | | Lens | radii | thicknesses and spacings | N |
| A | I | $L_1$ | $R_1 = +7.76825$ | | |
| | | | $R'_1 = +1.05870$ | $d_1 = 0.070290$ | $n_1 = 1.61772$ |
| | | | | $s_{12} = 0.606421$ (α) | |
| | | $L_{2a}$ | $R_{2a} = +1.52799$ | $d_{2a} = 0.100000$ | $n_{2a} = 1.78831$ |
| | | | $R'_{2a} = +6.01587$ | | |
| B | II | | | $s_{2a,b} = 0.040000$ | |
| | | $L_{2b}$ | $R_{2b} = +6.01587$ | $d_{2b} = 0.164620$ | $n_{2b} = 1.78831$ |
| | | | $R'_{2b} = -4.18430$ | | |
| | | | | $s_{23} = 0.002756$ | |
| | | $L_{3a}$ | $R_{3a} = +0.98508$ | $d_{3a} = 0.239812$ | $n_{3a} = 1.78831$ |
| | | | $R'_{3a} = -14.2181$ | | |
| M | III | | | $s_{3a,b} = 0$ | |
| | | $L_{3b}$ | $R_{3b} = -14.2181$ | $d_{3b} = 0.210869$ | $n_{3b} = 1.71736$ |
| | | | $R'_{3b} = +0.85922$ | | |
| | | | | CS = $s_{34} = 0.0204805$ | |

-continued

| | | | Lens | radii | thicknesses and spacings | N | |
|---|---|---|---|---|---|---|---|
| | | | | $F = 1.00000$ f/1.24 $2\omega_o = 44°$ $s'_\infty = + 0.71784$ F | | | |
| | IV | $L_4$ | | $R_4 = - 51.95935$ | $d_4 = 0.052373$ | $n_4 = 1.54814$ | |
| | | | | $R'_4 = + 0.90368$ | $s_{45} = 0.162631$ | | |
| | V | $L_5$ | | $R_5 = - 0.82289$ | $d_5 = 0.041347$ | $n_5 = 1.76180$ | |
| | | | | $R'_5 = + 0.95715$ | $s_{56} = 0$ | | RG |
| | VI | $L_6$ | | $R_6 = + 0.95715$ | $d_6 = 0.206734$ | $n_6 = 1.78831$ | |
| | | | | $R'_6 = - 0.81701$ | $s_{67} = 0.002756$ (δ) | | |
| LP = | VII | $L_7$ | | $R_7 = + 1.46318$ | $d_7 = 0.121284$ | $n_7 = 1.78831$ | |
| | | | | $R'_7 = - 2.14293$ | | | |

6. A lens as defined in claim 1, wherein the characteristics of the lens components and their spatial relationship to each other are substantially in the proportions indicated by the data in the following table, all linear dimensions of radii, thicknesses, and spacings being expressed in proportion to the equivalent focal length of the entire lens system, which is considered as unity:

7. A lens as defined in claim 1, wherein the characteristics of the lens components and their spatial relationship to each other are substantially in the proportions indicated by the data in the following table, all linear dimensions of radii, thicknesses, and spacings being expressed in proportion to the equivalent focal length of the entire lens system, which is considered as unity:

| | | | | | | |
|---|---|---|---|---|---|---|
| $F = 1.00000$ | | | | f/1.21 | $2\omega_o = 45°$ thicknesses and | $s'_\infty = + 0.71429F$ |
| | | | Lens | radii | spacings | N |
| A | I | $L_1$ | | $R_1 = + 4.53990$ | $d_1 = 0.068682$ | $n_1 = 1.67250$ |
| | | | | $R'_1 = + 1.00221$ | $s_{12} = 0.592560$ (a) | |
| B | II | $L_2$ | | $R_2 = + 1.36189$ | $d_2 = 0.335195$ | $n_2 = 1.78705$ |
| | | | | $R'_2 = - 4.22752$ | $s_{23} = 0.002830$ | |
| M | III | $L_3$ | | $R_3 = + 0.95494$ | $d_3 = 0.400773$ | $n_3 = 1.78822$ |
| | | | | $R'_3 = + 1.14955$ | CS = $s_{34} = 0.164177$ | |
| | IV | $L_4$ | | $R_4 = + 6.75332$ | $d_4 = 0.044204$ | $n_4 = 1.58279$ |
| | | | | $R'_4 = + 0.66855$ | $s_{45} = 0.172282$ | |
| | V | $L_5$ | | $R_5 = - 0.79570$ | $d_5 = 0.030467$ | $n_5 = 1.83037$ |
| | | | | $R'_5 = + 0.96306$ | $s_{56} = 0$ | RG |
| | VI | $L_6$ | | $R_6 = + 0.96306$ | $d_6 = 0.209150$ | $n_6 = 1.78826$ |
| | | | | $R'_6 = - 0.78469$ | $s_{67} = 0.002747$ (δ) | |
| LP = | VII | $L_7$ | | $R_7 = + 1.28382$ | $d_7 = 0.111430$ | $n_7 = 1.78830$ |
| | | | | $R'_7 = - 2.3490$ | | |

| | | | | | | |
|---|---|---|---|---|---|---|
| $F = 1.00000$ | | | | f/1.24 | $2\omega_o = 45.5°$ thicknesses and | $s'_\infty = + 0.71784F$ |
| | | | Lens | radii | spacings | $n_d/\nu_d$ |
| A | I | $L_1$ | | $R_1 = + 7.76825$ | $d_1 = 0.070290$ | 1.61772/49.78 |
| | | | | $R'_1 = + 1.05870$ | $s_{12} = 0.606421$ (a) | |
| B | II | $L_2$ | | $R_2 = + 1.52799$ | $d_2 = 0.264620$ | 1.78831/47.37 |
| | | | | $R'_2 = - 4.18431$ | $s_{23} = 0.002756$ | |
| | | $L_{3a}$ | | $R_{3a} = + 0.98508$ | $d_{3a} = 0.239812$ | 1.78831/47.37 |
| | | | | $R'_{3a} = - 14.21809$ | | |
| M | III | | | | $s_{3a,b} = 0$ | |
| | | $L_{3b}$ | | $R_{3b} = - 14.21809$ | $d_{3b} = 0.210869$ | 1.71736/29.52 |
| | | | | $R'_{3b} = + 0.85922$ | CS = $s_{34} = 0.204805$ | |

-continued

| F = 1.00000 | | | f/1.24 | | $2\omega_o = 45.5°$ thicknesses and spacings | $s'_\infty = +0.71784F$ $n_d/v_d$ | |
|---|---|---|---|---|---|---|---|
| | IV | $L_4$ | $R_4 = -51.95926$ | | $d_4 = 0.052373$ | 1.54814/45.75 | |
| | | | $R'_4 = +0.90368$ | | $s_{45} = 0.162631$ | | |
| | V | $L_5$ | $R_5 = -0.82289$ | | $d_5 = 0.041347$ | 1.76180/26.95 | |
| | | | $R'_5 = +0.95715$ | | $s_{56} = 0$ | | RG |
| | VI | $L_6$ | $R_6 = +0.95715$ | | $d_6 = 0.206734$ | 1.78831/47.37 | |
| | | | $R'_6 = -0.81701$ | | $s_{67} = 0.002756\ (\delta)$ | | |
| LP = VII | | $L_7$ | $R_7 = +1.46318$ | | $d_7 = 0.121284$ | 1.78831/47.37 | |
| | | | $R'_7 = -2.14293$ | | | | |

8. A lens as defined in claim 1, wherein the characteristics of the lens components and their spatial relationship to each other are substantially in the proportions indicated by the data in the following table, all linear dimensions of radii, thicknesses, and spacings being expressed in proportion to the equivalent focal length of the entire lens system, which is considered as unity:

| F = 1.00000 | | | f/1.21 | $2\omega_o = 45.5°$ | $s'_\infty = +0.73146F$ thicknesses and spacings | $n_d/v_d$ | |
|---|---|---|---|---|---|---|---|
| A | I | $L_1$ | $R_1 = +15.57624$ | | $d_1 = 0.057607$ | 1.62299/58.06 | |
| | | | $R'_1 = +0.97577$ | | $s_{12} = 0.597141\ (\alpha)$ | | |
| B | II | $L_2$ | $R_2 = +1.42875$ | | $d_2 = 0.271172$ | 1.78831/47.37 | |
| | | | $R'_2 = -3.96903$ | | $s_{23} = 0.005620$ | | |
| | | $L_{3_a}$ | $R_{3_a} = +0.98993$ | | $d_{3_a} = 0.32175$ | 1.78831/47.37 | |
| | | | $R'_{3_a} = -2.34756$ | | | | |
| M | III | | | | $s_{3_{a,b}} = 0$ | | |
| | | $L_{3_b}$ | $R_{3_b} = -2.34756$ | | $d_{3_b} = 0.160174$ | 162830/28.68 | |
| | | | $R'_{3_b} = +0.76948$ | | CS = $s_{34} = 0.244476$ | | |
| | IV | $L_4$ | $R_4 = -3.69407$ | | $d_4 = 0.061822$ | 1.60859/46.46 | |
| | | | $R'_4 = +1.87809$ | | $s_{45} = 0.147529$ | | |
| | V | $L_5$ | $R_5 = -0.73689$ | | $d_5 = 0.044961$ | 1.78470/26.08 | |
| | | | $R'_5 = +1.83793$ | | $s_{56} = 0$ | | RG |
| | VI | $L_6$ | $R_6 = +1.83793$ | | $d_6 = 0.185465$ | 1.78831/47.37 | |
| | | | $R'_6 = -0.74765$ | | $s_{67} = 0.002810\ (\delta)$ | | |
| LP = VII | | $L_7$ | $R_7 = +1.50255$ | | $d_7 = 0.122238$ | 1.78831/47.37 | |
| | | | $R'_7 = -2.10716$ | | | | |

9. A lens as defined in claim 1, wherein the characteristics of the lens components and their spatial relationship to each other are substantially in the proportions indicated by the data in the following table, all linear dimensions of radii, thicknesses, and spacings being expressed in proportion to the equivalent focal length of the entire lens system, which is considered as unity:

| F = 1.00000 | | | f/1.20 | | $2\omega_o = 45.5°$ thicknesses and spacings | $s'_\infty = +0.73079F$ $n_d/v_d$ |
|---|---|---|---|---|---|---|
| A | I | $L_1$ | $R_1 = +18.89009$ | | $d_1 = 0.064575$ | 1.56873/63.12 |
| | | | $R'_1 = +0.98899$ | | $s_{12} = 0.575133\ (\alpha)$ | |
| B | II | $L_2$ | $R_2 = +1.60180$ | | $d_2 = 0.309137$ | 1.78443/43.90 |
| | | | $R'_2 = -2.86893$ | | $s_{23} = 0.002748$ | |
| | | $L_{3_a}$ | $R_{3_a} = +0.90087$ | | $d_{3_a} = 0.273415$ | 1.68900/49.46 |
| | | | $R'_{3_a} = -5.10170$ | | | |
| M | III | | | | $s_{3_{a,b}} = 0$ | |
| | | $L_{3_b}$ | $R_{3_b} = -5.10170$ | | $d_{3_b} = 0.212961$ | 1.78470/26.08 |
| | | | $R'_{3_b} = +0.82618$ | | CS = $s_{34} = 0.229449$ | |

-continued

| F = 1.00000 | | | f/1.20 Lens radii | $2\omega_o = 45.5°$ thicknesses and spacings | $s'_\infty = +0.73079F$ $n_d/\nu_d$ |
|---|---|---|---|---|---|
| | IV | $L_4$ | $R_4 = -28.30325$ | $d_4 = 0.054133$ | 1.54814/45.75 |
| | | | $R'_4 = +0.99630$ | $s_{45} = 0.148386$ | |
| | V | $L_5$ | $R_5 = -0.77446$ | $d_5 = 0.032975$ | 1.74080/28.09 |
| | | | $R'_5 = +1.18404$ | $s_{56} = 0$ | RG |
| | VI | $L_6$ | $R_6 = +1.18404$ | $d_6 = 0.197848$ | 1.78831/47.37 |
| | | | $R'_6 = -0.79703$ | $s_{67} = 0.002748\ (\delta)$ | |
| LP = VII | | $L_7$ | $R_7 = +1.34773$ | $d_7 = 0.122281$ | 1.78831/47.37 |
| | | | $R'_7 = -2.12082$ | | |

10. A lens as defined in claim 1, wherein the characteristics of the lens components and their spatial relationship to each other are substantially in the proportions indicated by the data in the following table, all linear dimensions of radii, thicknesses, and spacings being expressed in proportion to the equivalent focal length of the entire lens system, which is considered as unity:

| | | | | F = 1.00000 | f/1.20 Lens radii | $2\omega_o = 46°$ thicknesses and spacings | $s'_\infty = +0.72236F$ $n_d/\nu_d$ |
|---|---|---|---|---|---|---|---|
| A | I | $L_1$ | | | $R_1 = +5.19539$ | $d_1 = 0.063439$ | 1.68893/31.17 |
| | | | | | $R'_1 = +0.97859$ | $s_{12} = 0.605430\ (\alpha)$ | |
| B | II | $L_2$ | | | $R_2 = +1.44340$ | $d_2 = 0.270306$ | 1.78831/47.37 |
| | | | | | $R'_2 = -3.52283$ | $s_{23} = 0.002758$ | |
| M | III | $L_3$ | | | $R_3 = +1.00005$ | $d_3 = 0.477172$ | 1.78831/47.37 |
| | | | | | $R'_3 = +0.95092$ | $CS = s_{34} = 0.193075$ | |
| | IV | $L_4$ | | | $R_4 = -9.10709$ | $d_4 = 0.048269$ | 1.52341/51.47 |
| | | | | | $R'_4 = +0.90426$ | $s_{45} = 0.147565$ | |
| | V | $L_5$ | | | $R_5 = -0.91722$ | $d_5 = 0.030340$ | 1.84666/23.82 |
| | | | | | $R'_5 = +0.83541$ | $s_{56} = 0$ | RG |
| | VI | $L_6$ | | | $R_6 = +0.83541$ | $d_6 = 0.217899$ | 1.78831/47.37 |
| | | | | | $R'_6 = -0.822929$ | $s_{67} = 0.002758\ (\delta)$ | |
| LP = VII | | $L_7$ | | | $R_7 = +1.24989$ | $d_7 = 0.121362$ | 1.78831/47.37 |
| | | | | | $R'_7 = -2.49393$ | | |

* * * * *